United States Patent [19]

Sikula, Jr.

[11] 4,222,875
[45] Sep. 16, 1980

[54] FILTER ELEMENT SHUTOFF VALVE

[75] Inventor: William J. Sikula, Jr., Waterloo, Iowa

[73] Assignee: Deere & Company, Moline, Ill.

[21] Appl. No.: 897,379

[22] Filed: Apr. 18, 1978

[51] Int. Cl.² .................... B01D 27/04; B01D 27/10; F16K 17/06
[52] U.S. Cl. .................... 210/235; 210/429; 137/614.17; 137/614.21; 123/196 R
[58] Field of Search ............. 137/614, 614.03, 614.05, 137/614.11, 614.14, 614.19, 614.21, 614.17, 512.2; 210/134, 136, 235, 240, 282, 287, 429, 431; 123/196 R

[56] References Cited

U.S. PATENT DOCUMENTS

| | | | |
|---|---|---|---|
| 3,289,841 | 12/1966 | Quinting | 137/512.2 X |
| 3,542,067 | 11/1970 | Douglas | 137/614.19 X |
| 3,559,689 | 2/1971 | Dunbar et al. | 137/614.19 X |
| 3,572,376 | 3/1971 | Pfeifer et al. | 137/512.2 |
| 4,077,876 | 3/1978 | Southall | 210/235 X |

*Primary Examiner*—Ferris H. Lander

[57] ABSTRACT

A valve for preventing the loss of fluid from a fluid circuit in an engine block when a screw on filter element located at a low point in the circuit is removed includes a bore in the engine block having an inlet passage connected to the bore near a valve seat which connects the bore to the outside of the engine block. The bore contains a poppet valve having a threaded end for engaging the filter element and a pin and spring combination passing through a longitudinal slot in the poppet valve to cause the poppet valve to block the bore to prevent the loss of fluid. The poppet valve is hollow and open to an outlet passage in the engine block which is spaced away from and is always blocked from the inlet passage. The through passage has a check surface and contains a check ball and check spring which are disposed between the pin and the threaded end of the poppet valve. The check spring has a free height which causes it to act to prevent the flow of fluid from the outlet passage when the bore is blocked by the poppet valve but allow the flow when the bore is unblocked. The poppet valve is opened by screwing on the filter element which allows fluid to enter the inlet of the filter element. After the fluid is filtered the fluid exits from the filter element through a center outlet and past the check ball and out the outlet passage.

9 Claims, 2 Drawing Figures

FILTER ELEMENT SHUTOFF VALVE

BACKGROUND OF THE INVENTION

The present invention relates generally to systems for preventing the loss of fluid from a fluid circuit when a filter element located at a low end of the circuit is removed and more particularly relates to an automatic filter element shutoff valve.

In the past, when a filter element was removed from a low point in the fluid circuit, two manual valves, one on the inlet passage and one on the outlet passage, had to be closed in order to prevent fluid from being drained or siphoned out of the fluid circuit. When only one valve was closed, fluid would drain or siphon from the other passage resulting in a loss of fliud from at least a portion of the fluid circuit.

Further, when the new filter was put into place, it was necessary to remember to manually open both valves to avoid causing a catastrophic failure in other portions of the fluid circuit.

SUMMARY OF THE INVENTION

The present invention relates to a valve which shuts off both the inlet and outlet passages automatically during the normal operation of removing the filter element.

The above and additional advantages of the present invention will become apparent to those skilled in the art from a reading of the following detailed description when taken in conjunction with the accompanying drawings.

DESCRIPTION OF THE PREFERRED EMBODIMENT

Figure 1:
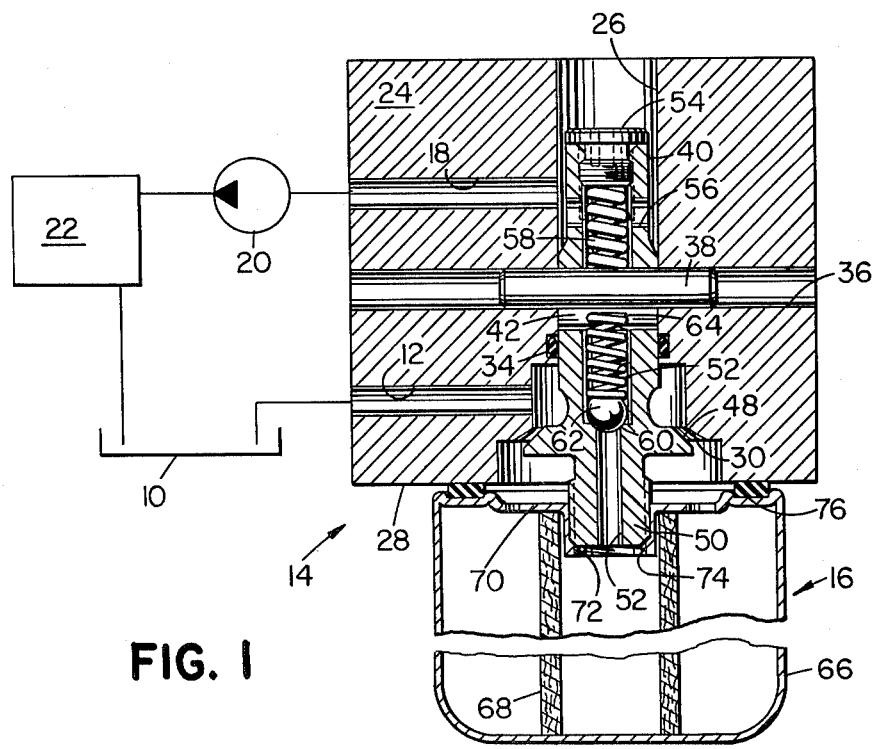
FIG. 1 is a schematic illustration partially in section of the fluid system embodying the present invention.

Referring now to FIG. 1, therein is shown a fluid circuit which includes a reservoir 10 connected by an inlet passage 12 to an automatic filter element shutoff valve 14 with an attached filter element 16. The shutoff valve 14 is further connected to an outlet passage 18 which is connected to the inlet of a conventional fluid pump 20. The pump 20 supplies fluid to various functions generally designated by the numeral 22 which could be either oil or coolant utilizing functions. The functions 22 are connected to return fluid back to the resevoir 10.

In an internal combustion engine (not shown) which is where the shutoff valve 14 is generally used, the shutoff valve 14 is disposed in an engine block 24.

The shutoff valve 14 includes a poppet valve bore 26 which is positioned perpendicular to a planar sealing surface 28 on the engine block 24. The poppet valve bore 26 is connected to the sealing surface 28 by an outwardly inclined valve seat 30.

The inlet passage 12 is connected to the poppet valve bore 26 adjacent to the valve seat 30 and adjacent thereto is an O-ring seal 34. Adjacent to the inlet passage 12 and distally spaced from the sealing surface 28 is a pin hole 36 into which a dowel pin 38 is inserted.

The outlet passage 18 is connected to the poppet valve bore 26 adjacent to the pin hole 36.

A poppet valve 40 is slidably disposed in the poppet valve bore 26 and passes through the O-ring seal 34 to permanently block fluid communication between the inlet passage 12 and the outlet passage 18. The poppet valve 40 includes a through slot 42 through which the dowel pin 38 extends to limit the movement of the poppet valve 40 in the poppet valve bore 26. A poppet sealing surface 48 encircles one end of the poppet valve 40 and is engageable with the valve seat 30 to prevent the flow of fluid therebetween when engaged. A threaded portion 50 is located adjacent the poppet sealing surface 48 and extends past the sealing surface 28.

The poppet valve 40 has provided therein a through passage 52 which extends from the threaded portion 50 through to the opposite end of the poppet valve 40 where it is blocked by a poppet cap 54. The through passage 52 has connected thereto outlet ports 56 which are located between the poppet cap 54 and the slot 42. The outlet ports 56 connect the through pasage 52 to the outlet passage 18.

A poppet spring 58 is disposed in the through passage 52 between the poppet cap 54 and the dowel pin 38 so as to urge the poppet valve 40 into a position where the poppet sealing surface 48 will engage the valve seat 30. On the other side of the dowel pin 38 there is provided a check seat 60 against which a check ball 62 is engageable. Between the check ball 62 and the dowel pin 38 in the through passage 52 there is disposed a check spring 64. The check spring 64 has a predetermined free length such that when the poppet sealing surface 48 is out of engagement with the valve seat 30, the check spring 64 will be out of contact with the dowel pin 38 so as to allow free flow of fluid between the check seat 60 and the check ball 62. When the poppet sealing surface 48 is in engagement with the valve seat 30, the check spring 64 loads the check ball 62 so as to prevent the flow of fluid past the check ball 62 and the check seat 60.

The conventional filter element 16 consists of a conventional cylindrical filter casing 66 which contains a concentric filter medium 68. The filter medium 68 separates inlet passages 70 from an outlet passage 72 which is concentric with the filter casing 66. The outlet passage 72 is provided with a threaded portion 74 which is engageable with the threaded portion 50 of the poppet valve 40. Encircling the inlet passages 70 and disposed between the filter casing 66 and the sealing surface 28 is a planar filter seal 76 which is engageable against the sealing surface 28 to prevent the leakage of fluid therebetween.

In the normal operating position as shown in FIG. 1, the filter casing 66 with seal 76 abuts the engine block 24. With the filter seal 76 in sealing engagement with the sealing surface 28, and the dowel pin 38 abutting the top of the slot 42, the poppet sealing surface 48 will be pulled out of engagement with the valve seat 30.

With the pump 20 in operation, fluid is drawn from the reservoir 10 through the inlet passage 12 to pass between the poppet sealing surface 48 and the valve seat 30 to enter the inlet passages 70 of the filter element 16. The fluid is filtered by the filter medium 68 and is drawn out of filter element 16 through the through passages 52. As shown, the check spring 64 is free of the dowel pin 38 so as to allow free flow of fluid between the check seat 60 and the check ball 62 and around the dowel pin 38 to the outlet ports 56 and thence to the outlet passage 18 and into the pump 20 and to the functions 22.

When the filter element 16 is to be removed, the filter element 16 is rotated so as to cause the disengagement of the threaded portion 74 from the threaded portion 50 of the poppet valve 40.

Figure 2:
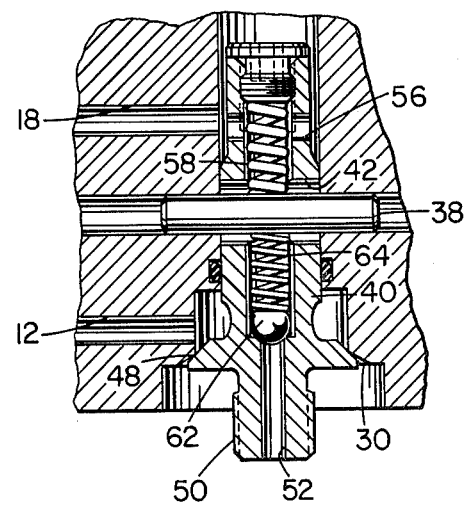
FIG. 2 is a cross-sectional partial view of the valve of the present invention in an alternate position.

Initially while the filter element 16 is rotated, the filter seal 76 will remain in engagement with the sealing surface 28 until the poppet valve 40 reaches the position shown in FIG. 2. In the closed position, the poppet sealing surface 48 has been drawn into contact with the valve seat 30 by the poppet spring 58 abutting the dowel pin 38. This blocks the inlet passage 12 of the engine block 24 from the inlet passage 70 of the filter element 16. Simultaneously, the check spring 64 has engaged the dowel pin 38 so as to provide a load on the check ball 62 to cause it to seat against the check seat 60 so as to prevent the loss of fluid from the outlet passage 18 through the through passage 52.

After the position of the shutoff valve 14 as shown in FIG. 2 has been reached, the filter element 16 may be turned further to separate the filter seal 76 from the sealing surface 28 and to allow removal of the filter element 16.

When replacing the filter element 16, the filter seal 76 must first be brought into sealing contact with the sealing surface 28 before the poppet sealing surface 48 will separate from the valve seat 30 and before the check spring 64 will disengage from the dowel pin 38. Further rotation of the filter element 16 causes the shutoff valve 14 to automatically open to again reach the position shown in FIG. 1.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A fluid shutoff valve engageable with a filter element which has an inlet and an outlet passage, a planar filter seal which encircles said inlet and outlet passages, and a threaded female portion aligned axially perpendicular to said filter seal and connected to said outlet passage, wherein said shutoff valve comprises:
   (a) valve body means comprising a planar body surface engageable with said filter seal for blocking the passage of fluid therebetween, a bore in said valve body means perpendicularly positioned to said planar body surface and having a peripheral valve seat connecting said bore to said planar body surface, said valve seat being in fluid communication with said inlet passage of said filter when said planar body surface engages said filter seal, and spaced apart inlet and outlet valve passages connected to said bore at spaced locations along the axial length thereof;
   (b) a poppet valve slidably disposed in said bore comprising a through passage for providing fluid communication between said outlet passage of said filter and said outlet passage of said valve, a peripherally positioned poppet seal surface engageable with said valve seat for blocking the passage of fluid therebetween, a threaded male portion located at one end of said poppet valve which encircles said through passage and is engageable with said female portion of said filter element, engaging said threaded portions disengages said poppet seal surface from said valve seat after said filter seal abuts said planar body surface which allows fluid communication between said inlet passage of said valve and said inlet passage of said filter and also between said outlet passage of said valve and said outlet passage of said filter;
   (c) slot means provided in both said valve body means and said poppet valve which extend therethrough distal from said valve seat, said slot means intersecting said through passage of said poppet valve;
   (d) pin means disposed in said slot means positioned between said inlet and outlet passages and extending through said poppet valve for preventing rotation of said poppet valve in said bore; and
   (e) biasing means disposed in said through passage abutting said pin means and said poppet valve for urging said poppet valve to a position wherein said poppet seal surface can engage said valve seat.

2. The fluid shutoff valve of claim 1 wherein said poppet valve comprises a check seat disposed in said through passage located between said slot means and said threaded male portion, check means disposed in said through passage engageable with said check seat for blocking the passage of fluid through said through passage, and biasing means inactive when said filter seal engages said planar body surface and active for urging said check means into engagement with said check seat when said poppet seal surface engages said valve seat.

3. The fluid shutoff valve of claim 2 comprising sealing means disposed in said bore and encircling said poppet valve for blocking the passage of fluid between said inlet and outlet passages of said valve body means.

4. A fluid shutoff valve engageable with a filter element which has a filter medium concentrically positioned about a filter outlet passage and concentrically positioned within a filter inlet passage, a planar filter seal encircling said filter inlet passage, and a threaded female portion aligned axially perpendicular to said filter seal and disposed in said filter outlet passage, wherein said shutoff valve comprises:
   (a) a valve body comprising a planar surface engageable with said filter seal for blocking the leakage of fluid therebetween, a bore perpendicularly positioned to said planar body surface and having a peripheral valve seat, said valve seat connecting said bore to said planar body surface, said valve seat being in fluid communication with said inlet passage of said filter when said planar body surface engages said seal of said filter, an inlet and an outlet valve passage, said inlet passage located proximate said valve seat and said outlet passage located away from said valve seat;
   (b) pin means provided in said valve body and spaced between said inlet and outlet valve passages, said pin means intersecting said bore;
   (c) a longitudinally extending poppet valve slidably disposed in said bore comprising a longitudinally extending poppet valve bore provided therein which is open at a first end and closed at a second end, a slot positioned perpendicular to said longitudinally extending poppet valve bore for engaging said pin means for preventing rotation of said poppet valve in said bore, said first end and said second end located proximate said planar body surface and said outlet passage, said first end having a threaded male portion provided thereon for engaging said threaded female portion of said filter element and said second end having outlet ports provided therein for providing a fluid connection with said outlet valve passage, a radial outwardly extending poppet sealing surface disposed between said first and second ends and proximate to said threaded male portion which is engageable with said valve seat for blocking the passage of fluid from said inlet passage to said filter element; and (d) a spring positioned between said closed end of said longitudinally extending poppet valve bore and said pin means for urging said poppet valve into a position in which said poppet sealing surface engages said valve seat, said position overcomeable by engagement of said male and female threaded portions for allowing the passage of fluid from said inlet valve passage into said filter inlet passage, through said filter medium, out from said filter outlet passage, through said longitudinally extending poppet valve bore and out said outlet ports to said outlet valve passage.

5. The fluid shutoff valve of claim 4 wherein said poppet valve comprises a check ball surface disposed in said longitudinally extending poppet valve bore between said first end and said pin means, a check ball engageable with said check ball surface for blocking the passage of fluid therebetween, and a check spring comprising a predetermined free height which allows said check ball to disengage from said check ball surface when said threaded male and female portions engage thereby allowing the passage of fluid between said poppet sealing surface and said valve seat while preventing the flow of fluid therebetween when said poppet sealing surface engages said valve seat.

6. The fluid shutoff of claim 5 comprising sealing means disposed in said longitudinally extending poppet valve bore which encircles said poppet valve for blocking the passage of fluid between said inlet and outlet passages of said valve body.

7. A shutoff valve for use in combination with a filter element having filter inlet and outlet passages, a filter seal encircling said filter inlet and outlet passages, and valve engagement means connected to one of said filter inlet and outlet passages, said shutoff valve comprising:

(a) valve body means comprising a body surface engageable with said filter seal for blocking the passage of fluid therebetween; a valve bore located therein and positioned perpendicular to said body surface, and a valve seat therein connecting said valve bore to said body surface;

(b) first and second passages provided in said valve body for connecting said valve bore at spaced locations;

(c) a valving member disposed in said valve bore for blocking the passage of fluid between said first and second passages and movable between a first and a second position;

(d) a sealing surface provided on said valving member for engagement with said valve seat, in said first position said valving member blocks the passage of fluid between said first passage and said filter inlet passage and in said second position, said valving member permitting fluid flow from said first passage to said filter inlet passage;

(e) means for yieldably biasing said valving member to said first position;

(f) engagement means located on said valving member for engaging said filter engagement means, said engagement means capable of moving said valving member to said second position when said filter seal is in engagement with said valve body surface; and (g) passage means situated in said valving member for providing communication between said second passage and said filter outlet passage.

8. The shutoff valve of claim 7 wherein said valving member is reciprocally mounted in said valve bore and is biased inward from said body surface.

9. The shutoff valve of claim 8 wherein said valve and filter engagement means comprises complementary threaded portions of said valving member and said filter for allowing said filter to be threaded onto said valving member which causes said filter seal to engage said valve body surface and for said valving member to move to said second position.

* * * * *